United States Patent Office 3,632,840
Patented Jan. 4, 1972

3,632,840
HALOGEN CONTAINING POLYETHER POLYMER WITH AN ETHYLENICALLY UNSATURATED MONOMER GRAFT
Edwin J. Vandenberg, Wilmington, Del., assignor to Hercules Incorporated, Wilmington, Del.
No Drawing. Filed Nov. 26, 1968, Ser. No. 779,231
Int. Cl. C08f 29/22, 29/24
U.S. Cl. 260—899
13 Claims

ABSTRACT OF THE DISCLOSURE

Disclosed is a normally solid polyether polymer with many embodiments having a wide variety of uses and characterized by (a) at least one halo-substituted radical bonded to a chain carbon and selected from the group consisting of the halo-substituted hydrocarbon, hydrocarbon-oxy and hydrocarbon-oxy-hydrocarbon radicals and (b) a graft to at least one chain carbon, which graft comprises at least one free radically polymerizable ethylenically unsaturated monomer unit and usually a polymer of free radically polymerizable ethylenically unsaturated monomer material. The graft polymer is made by reacting (1) a normally solid polyether polymer having (a) at least one halo-substituted radical bonded to a chain carbon and selected from the group consisting of the halo-substituted hydrocarbon, hydrocarbon-oxy and hydrocarbon-oxy-hydrocarbon radicals, and (b) at least one hydrogen bonded to a chain carbon, with (2) free radically polymerizable ethylenically unsaturated monomer material. Preferably the reaction is effected with free radical material under free radical polymerizing conditions.

---

This invention relates to polymers and more particularly to polymers of the graft type.

In summary, this invention in one aspect comprises a polyether polymer having (a) at least one halo-substituted radical bonded to a backbone or chain carbon and selected from the group consisting of the halo-substituted, hydrocarbon, hydrocarbon-oxy and hydrocarbon-oxy-hydrocarbon radicals, and (b) a graft comprising at least one free radically polymerizable ethylenically unsaturated monomer unit, which graft is bonded to a chain carbon of the polyether polymer.

A polyether polymer is a polymer in which the backbone or chain is formed by oxygen and carbon atoms bonded together in recurring units of the oxygen-carbon skeletal Formula I:

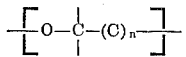

wherein $n$ broadly is 0–9 and usually 0–4. Under the concepts of this invention $n$ broadly is 1–9 and usually 1–3. These units are frequently referred to as monomer units. The polymer chain is usually terminated at each end with a hydrogen radical or the like. Although the broader concepts of this invention include polyether polymers having just one halo-substituted radical bonded to a chain carbon atom and selected from the above group of halo-substituted radicals, most embodiments of the polyether polymer of this invention comprise more than one such radical. A halo-substituted hydrocarbon radical, a halo-substituted hydrocarbon-oxy radical and a halo-substituted hydrocarbon-oxy-hydrocarbon radical are radicals in which there is at least one halo-substituted carbon, that is, in which there is at least one carbon with at least one halo radical. Examples of a halo radical are the fluoro, chloro, bromo and iodo radicals. Generally, but not necessarily, in these embodiments the halo-substituted radical is recurrent, being part of a recurring unit. In some embodiments of this invention the polyether polymer is a homopolymer, there being only one recurring unit. In other embodiments it is a copolymer, there being more than one recurring unit of the above oxygen-carbon skeletal formula, in some instances being a copolymer (here used in its narrower sense of two different recurring units), in other instances a terpolymer (three different recurring units), etc. Some of these copolymers (here used in the broader or generic sense) are of the block or ordered polymer type while others are of the random polymer type. In several embodiments the polyether polymer without the graft is crystalline; in other embodiments it is amorphous. Further discussion of the polyether polymer is set forth hereinafter relative to the process aspect of this invention.

At least one chain carbon of the polyether polymer in this invention is chemically attached to a carbon atom of a graft formed by at least one and often more than one free radically polymerizable ethylenically unsaturated monomer unit.

A free radically polymerizable ethylenically unsaturated monomer unit is characterized by a chain carbon skeletal structure according to the Formula II:

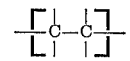

Its origin is an ethylenically unsaturated organic compound or monomer that can be polymerized by a free radical mechanism. Further discussion of free radically polymerizable monomer units and corresponding monomers appears hereinafter in the discussion of the process aspect of this invention.

In preferred embodiments the graft is a polymer of free radically polymerizable ethylenically unsaturated monomer units. In some of these preferred embodiments the units are the same. In other preferred embodiments the units are different.

The number of grafts of one or more alike or different free radically polymerizable ethylenically unsaturated monomer units to each polyether polymer chain under the concepts of this invention is at least one and can be as high as twice the number of chain carbon atoms in the polyether polymer less the number of substituents, except hydrogen, on the chain carbon atoms. In general, the number of free radically polymerizable ethylenically unsaturated monomer units present in the graft portion of the graft polymer is broadly in a range from about 1 to about 100,000 per 200 monomer units of the polyether polymer portion, preferably in a range from about 1 to about 10,000 per 200 monomer units in the polyether polymer portion, and in some preferred embodiments in a range from about 5 to about 500 units per 200 monomer units in the polyether polymer portion.

The graft polymer of this invention in general is normally solid, specific embodiments thereof ranging from soft to very tough rubbers to hard tough rigid solids. In general, it is thermoplastic in the sense of being thermally formable. Some specific embodiments of it are insoluble in water while other specific embodiments are at least water dispersible, and still other specific embodiments are water-soluble. In some embodiments, the polymer of this invention is insoluble in liquids such as heptane and the like, and soluble in liquids such as benzene and the like.

The graft polymer of this invention has a wide variety of uses, depending on the polyether polymer portion and the graft portion of the polymer. In general, specific embodiments of the polymer of this invention have broad utility as elastomers including elastic fibers, as polymer alloying agents to improve impact strength, and as agents to promote adhesion between polar polymers and substrates such as metals and the like. The graft polymer of this invention in general has utility as material of construction for films, sheets, fibers, bars and other shaped articles, and in coatings and the like.

In these uses, the graft polymer of this invention can be alone or blended with one or more similar or different polymers, and can contain reinforcing and non-reinforcing fillers and extenders, colorants including pigments and the like, plasticizers, stabilizers including antioxidants, ultra-violet light inhibitors, heat-stabilizers and the like, antistatic agents, mold release agents, and the like.

This invention in another aspect comprises a process for making a graft product consisting essentially of the foregoing graft polymer. In summary, this process comprises reacting (1) hereinafter defined polyether polymer material with (2) free radically polymerizable ethylenically unsaturated monomer material hereinafter referred to as graft monomer material.

The polyether polymer material in the process of this invention comprises at least one normally solid starting polyether polymer having (a) at least one halo-substituted radical bonded to a chain carbon and selected from the group consisting of the halo-substituted, hydrocarbon, hydrocarbon-oxy and hydrocarbon-oxy-hydrocarbon radicals, and (b) at least one hydrogen atom bonded to a chain carbon. In some embodiments of the process of this invention only one such polyether polymer is involved. In other embodiments more than one such polyether polymer is present, two, three or more such polymers being employed. While under the broad concepts of this invention the polyether polymer need have only one chain carbon with a halo-substituted radical from the above group, usually more than one such chain carbon is present. The same is likewise true relative to a chain carbon with a hydrogen. The polyether polymer can be a homopolymer, there being only one recurring monomer unit. On the other hand, it can be a copolymer, there being two or more different recurring units of the above oxygen-carbon skeletal Formula I. The copolymer can be of the block or ordered polymer type, or it can be of the random polymer type. The polyether polymer can be crystalline or amorphous. In those embodiments wherein the polyether polymer material comprises two or more such polyether polymers, all of the polymers can be either homopolymers or copolymers. They can be all crystalline polymers or all amorphorus polymers. On the other hand, the polyether polymer material in these embodiments can comprise both homo- and copolymers, and it can comprise both crystalline and amorphous polymers.

A preferred starting polyether polymer in the process of this invention is a normally solid polymer having at least one recurring monomer unit according to the Formula III:

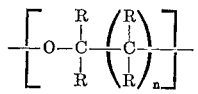

wherein $n$ is 1–3, each R is selected independently of each other R, except as indicated, from the group consisting of the hydrogen radical, the alkyl, alkoxy-alkyl, alkenyl, alkenyl-oxy-alkyl, aryl, aryl-oxy-alkyl, alkylaryloxyalkyl, alkenylaryloxyalkyl, cycloalkyl, alkylcycloalkyl, alkenylcycloalkyl, cycloalkenyl, alkylcycloalkenyl, cycloalkyloxyalkyl, alkylcycloalkyloxyalkyl, and alkenylcycloalkyloxy radicals, unsubstituted and halo-substituted, and ring members of unsubstituted and halo-substituted cyclic organo structures having as a ring member at least one of the other R's, but with at least one of the R's being a halo-substituted radical selected from this group and at least another one of the R's being the hydrogen radical. Preferably the alkyl, alkenyl, cycloalkyl and cycloalkenyl radicals, and corresponding portions of the radicals of the foregoing group have 1–20 carbon atoms, the aryl radicals and aryl portions of the radicals of the foregoing group have 6–14 carbon atoms and the cyclic organo structures have 5–12 carbon atoms. Specific examples of a starting polyether polymer having recurring monomer units according to Formula III include the normally solid amorphous and crystalline homopolymers of haloalkylene oxides such as:

epifluorohydrin,
epichlorohydrin,
epibromohydrin, and
epiiodohydrin,
2-methyl-3-chloro-1,2-epoxypropane,
1,2-dichloro-3,4-epoxybutane,
1-chloro-3,4-epoxybutane,
1-chloro-4,5-epoxypentane,
1,1-dichloro-2,3-epoxypropane,
1,1,1-trichloro-2,3-epoxypropane,
1,1,1-trichloro-3,4-epoxybutane,
1,1,1-trifluoro-2,3-epoxypropane,
cis-1,4-dichloro-2,3-epoxybutane,
trans-1,4-dichloro-2,3-epoxybutane, and the like, haloalkyl glycidyl ethers such as:
2,2-bis(chloromethyl)ethyl glycidyl ether,
2-chloroethyl glycidyl ether,
2-bromoethyl glycidyl ether,
2-chloro-1-methylethyl glycidyl ether,
2,2,2-tris(chloromethyl)ethyl glycidyl ether, and the like, haloaryl glycidyl ethers such as:
p-chlorophenyl glycidyl ether,
o-chlorophenyl glycidyl ether, and the like.

haloalkylaryl glycidyl ethers such as:
chloromethylphenyl glycidyl ether,
chloromethylnaphthyl glycidyl ether, and the like, haloalkyl and haloalkoxy oxetanes such as:
2-chloromethyl oxetane,
2-β-bromoethyl oxetane,
2-fluoromethyl oxetane,
2-trifluoromethyl oxetane,
2-γ-iodopropyl oxetane,
2-β-chlorobutyl oxetane,
2-fluoromethoxy oxetane,
2-chloromethoxy oxetane,
2-bromomethoxy oxetane,
2-iodomethoxy oxetane,
2-β-chloroethoxy oxetane,
2-β-bromobutoxy oxetane,
2-β-fluorooctoxy oxetane,
2-fluoromethoxy methyl oxetane,
2-β-chloroethoxy methoxy oxetane,
2-γ-bromo isopropoxy methyl oxetane,
2-γ-iodobutoxy methyl oxetane,
2-γ-fluorohexoxy methyl oxetane,
2-ω-chlorodecoxy methyl oxetane,
3-β-bromoethyl oxetane,
3-β-iodomethyl oxetane,
3-trifluoromethyl oxetane,
3-β-iodopropyl oxetane,
3-β-chlorobutyl oxetane,
3,3-bis(chloromethyl) oxetane,
3,3-bis(fluoromethyl) oxetane,
3,3-bis(iodomethyl) oxetane,
3,3-bis(bromomethyl) oxetane,
3-fluoromethoxy oxetane,
3-chloromethoxy oxetane,
3-bromomethoxy oxetane,
3-iodomethoxy oxetane,
3-β-chloroethoxy oxetane,
3-ω-bromobutoxy oxetane,
3-β-fluorooctoxy oxetane,
3-fluoromethoxy methyl oxetane,
3-β-chloroethoxy methyl oxetane,
3-β-bromoisopropoxy methyl oxetane,
3-ω-iodobutoxy oxetane,
3-ω-fluorohexoxy methyl oxetane,
3-ω-chlorodecoxy methyl oxetane, and the like, halo-tetrahydrofuranes such as:
  3-(β-chloroethyl)-tetrahydrofuran,
  2-trifluoromethyltetrahydrofuran,
  2,3,4 - tris(trifluoromethyl) - tetrahydrofuran, and the like, and halo-substituted aldehydes such as:
  chloroacetaldehyde,
  chloral,
  trifluoroacetaldehyde, and the like, Specific examples of a starting polyether polymer according to Formula III include normally solid amorphous and crystalline copolymers, terpolymers, etc., of the foregoing halo-substituted monomers with each other, as well as of the foregoing halo-substituted monomers with copolymerizable monomers, examples of which comprise:

alkylene oxides such as:
  ethylene oxide,
  propylene oxide,
  1-butene oxide,
  cis-2-butene oxide,
  trans-2-butene oxide,
  isobutylene oxide,
  1-hexene oxide, and the like, cycloaliphatic oxides such as:
  cyclohexene oxide,
  vinyl cyclohexene oxide,
  vinyl cyclohexene dioxides,
  cyclooctene oxide, and the like, arylalkylene oxides such as:
  styrene oxide, and the like, alkenylalkylene oxides such as:
  butadiene monoxide, and the like, alkyl glycidyl ethers such as:
  methyl glycidyl ether,
  ethyl glycidyl ether,
  methylethyl glycidyl ether,
  isopropyl glycidyl ether,
  t-butyl glycidyl ether, and the like, aryl glycidyl ethers such as:
  phenyl glycidyl ether,
  naphthyl glycidyl ether,
  glycidyl ether of bisphenol, and the like, alkenyl glycidyl ethers such as:
  allyl glycidyl ether, and the like, alkenylaryl glycidyl ethers such as:
  o-allylphenyl glycidyl ether,
  p-crotylphenyl glycidyl ether, and the like, oxetanes such as:
  oxetane (also known as trimethylene oxide),
  2-methyloxetane,
  2-ethyloxetane,
  2-butyloxetane,
  2-octyloxetane,
  2-methoxyoxetane,
  2-ethoxyoxetane,
  2-propoxyoxetane,
  2-hexoxyoxetane,
  2-methoxymethyloxetane,
  2-ethoxymethyloxetane,
  2-butoxymethyloxetane,
  2-decoxymethyloxetane,
  3-methyloxetane,
  3-ethyloxetane,
  3-propyloxetane,
  3-butyloxetane,
  3-octyloxetane,
  3-methoxyoxetane,
  3-ethoxyoxetane,
  3-propoxyoxetane,
  3-hexoxyoxetane,
  3-methoxymethyloxetane,
  3-ethoxymethyloxetane,
  3-butoxymethyloxetane,
  3-decoxymethyloxetane,
  3,3-dimethyloxetane,
  3,3-diethyloxetane,
  3,3-dipropyloxetane,
  3,3-diisopropyloxetane,
  3,3-dibutyloxetane,
  3,3-dioctyloxetane,
  3-methyl-3-ethyloxetane,
  3-methyl-3-propyloxetane,
  3-ethyl-3-butyloxetane,
  3-isopropyl-3-propyloxetane,
  3-butyl-3-methyloxetane,
  3-propyl-3-hexyloxetane,
  and the like.

tetrahydrofuranes such as:
  tetrahydrofuran,
  2-methyltetrahydrofuran,
  2,3,4-trimethyltetrahydrofuran,
  and the like, alkanals such as:
  formaldehyde,
  acetaldehyde,
  propionaldehyde,
  n-butyraldehyde,
  isobutyraldehyde,
  pivalaldehyde,
  hexanal,
  octanal,
  methoxyacetaldehyde,
  3-ethoxypropionaldehyde,
  and the like, alkenals such as:
  acrolein,
  methacrolein,
  crotonaldehyde,
  and the like, heterocyclic aldehydes such as:
  furfural
  and the like, and the like. Especially preferred are the halo-substituted polyether polymers disclosed and claimed in the U.S. Patents, Nos. 3,058,922, 3,065,188, 3,135,705, 3,158,580, 3,158,581, 3,158,591, 3,214,390, 3,275,573, 3,285,862, 3,311,570 and 3,341,475, to Vandenberg.

In the preferred polyether polymer having recurring monomer units according to Formula III, generally these monomer units constitute at least about 1% of the total number of monomer units present in the polymer, and preferably at least about 5% of the total number of monomer units present in the polymer, and up to 100% of the total number of monomer units in the polymer.

The graft monomer material of this invention consists essentially of at least one free radically polymerizable ethylenically unsaturated compound or graft monomer. In some embodiments there is only one such monomer. In other embodiments there are two or more such monomers. Examples of such a monomer include such vinylidene and vinylene monomers as, for instance, styrene, alkyl-substituted styrenes such as alpha-methylstyrene and the like, monoolefins and diolefins such as, for instance, ethylene, propylene, butene-1, butadiene, and the like, unsaturated acids such as acrylic acid, methacrylic acid, maleuric acid, and the like, esters of unsaturated acids such as, for instance, the methyl, ethyl, butyl, hydroxyethyl, 2-cyanoethyl, and the like, esters of acrylic acid, methacrylic acid, alpha-chloroacrylic acid and the like, salts of these acids, such as, for example, sodium acrylate, lithium methacrylate, potassium acrylate, calcium acrylate, and the like, unsaturated nitriles, such as, for instance, acrylonitrile, methacrylonitrile, alpha-chloroacrylonitrile, and the like, unsaturated halides, such as, for instance, vinyl chloride, vinyl fluoride, vinylidene chloride, vinylidene fluoride and the like, vinyl esters such as, for instance, vinyl acetate, vinyl propionate, and the like, vinyl pyridine, vinyl ethers, vinyl sulfonic acid and its salts (for instance, magnesium vinyl sulfonate and the like), allyl compounds like allyl acetate, allyl alcohol, allyl chloride, methallyl chloride, methallyl acetate, allyl amine, etc., fumaric acid, salts of fumaric acid (potassium fumarate), diethyl maleate, dimethyl fumarate, cis and trans muconic acids, maleic anhydride, acrylamide, methacrylamide, diethylaminoacrylamide, itaconic acid, itaconic anhydride, maleimide, N-methyl maleimide, N-carbamyl-maleimide, pentamethyl disiloxane methyl methacrylate, methacryloxypropyltrimethoxysilane, diethylaminoethylacrylate, and the like. Especially preferred monomers are acrylonitrile, styreneacrylonitrile, styrene, vinyl chloride, maleic anhydride, vinyl acetate, methylmethacrylate and vinylidene chloride.

The quantity of graft monomer material employed in the process of this invention is within a broad range. It depends upon the number of graft monomer units desired in the graft polymer product and upon the reaction conditions. However, in general, the quantity is such as to provide a mol ratio of graft monomer units to halo-substituted radical containing monomer units in the polyether polymer material in a range from about 0.005:1 to about 400:1 and preferably in a range from about 0.1:1 to about 100:1.

Reaction of the starting polyether polymer material with graft monomer material is preferably effected with free radical material under free radical polymerizing conditions.

The free radical material involved in the process of this invention consists essentially of an organic compound capable of forming a free radical. In some embodiments the free radical material comprises just one such compound. Other embodiments, however, comprise two or more such compounds. Examples of an organic compound capable of forming a free radical include organic peroxides, such as for instance, diaroyl peroxides such as benzoyl peroxide, substituted benzoyl peroxides, and the like, diacyl peroxides such as acetyl peroxide and the like, dialkyl peroxides such as di-t-butyl peroxide, and the like, $\alpha,\alpha'$-dialkyl aryl peroxides such as dicumyl peroxide and the like, and mixed alkyl $\alpha,\alpha'$-dialkyl aryl peroxides such as tert-butyl cumyl peroxide and the like; organic hydroperoxides such as tert-butyl cumene hydroperoxide, diisopropylbenzene hydroperoxide, p-methane hydroperoxide, and the like; peresters such as tert-butyl-perbenzoate and the like; azo compounds such as azobis(isobutyronitrile) and the like; organo metallic compounds such as tetraethyl lead and the like; and peroxy carbonates such as diethyl peroxydicarbonate, diisopropyl peroxydicarbonate and the like.

The free radical material can also comprise a redox reducing agent. This is a compound which reacts with a compound capable of forming a free radical, and causes a free radical to be formed in a temperature range, generally lower than the temperature range required in the absence of the redox reducing agent, to be formed more rapidly, or to be formed more rapidly in a lower temperature range. Examples of a redox reducing compound include salts and complexes of metals capable of existing in more than one valence state, and which are preferably in a reduced oxidation state. Particularly preferred are vanadyl sulfate, ferrous sulphate, vanadyl acetylacetonate and ferrous acetylactonate. Other compounds are ferrous pyrophosphate, ferrous sulfide, the ferrous complex of ethylenedinitriloacetic acid, ferrous-o-phenanthroline, ferric acetylacetone, ferrocyanides, and the corresponding cobalt, nickel, copper, mercury, chromium, manganese, vanadyl, and the like compounds. Still other compounds include sodium formaldehyde sulfoxylate, formaldehyde and other aldehydes, reducing sugars like glucose, sorbose, etc., polyamines such as diethylenetriamine, triethylenetetramine, tetraethylenepentamine, and the like, monoamines, sodium hyposulfite, mercaptans, hydrazine, phenyl phydrazine, and the like. Redox reducing agents are particularly effective with organic hydroperoxides and diaroyl peroxides.

The quantity of free radical material employed in the process of this invention is an effective quantity. Such a quantity is generally present in a range from about 0.01% by weight to 10 times the weight of the graft monomer material, and preferably in a range from about 0.05 to about 100% by weight of the graft monomer material. The optimum quantity depends on the graft reaction conditions, the free radical material, the graft monomer material, the grafting level desired and the nature of the product desired.

To effect reaction of polyether polymer material and graft monomer material by free radical material it is necessary to admix these materials and apply free radical polymerizing conditions to the mixture.

The admixing step can be performed by conventional ways and means. For instance, the mixing is done by bulk polymerization procedures, solution polymerization procedures, emulsion polymerization procedures, suspension polymerization procedures, or the like. In one embodiment it is performed in an extruder, on a mill, or the like. The mixing step in some embodiments of the process of this invention is conducted on a batch basis and in other embodiments on a continuous basis.

The graft reaction of the polyether polymer material and graft monomer material in the mixture comprising free radical material is thermally activated in some embodiments, light activated in other embodiments, and both thermally and light activated in still other embodiments. When thermal activation alone is employed, the admixing step is performed in a temperature range in which free radical formation by the free radical material occurs. When a redox reducing agent is absent from the free radical material, generally the temperature range is from about 0 to about 200° C. However, when the free radical material comprises a redox reducing agent, generally the temperature range is from about −80 to about 200° C. and preferably from about −20 to about 120° C. However, higher and lower operable temperatures are within the broader concepts of this invention. When light activation is employed, generally substantially lower temperatures preferably are used as compared to temperatures employed when thermal activation alone is involved.

The graft reaction occurs over a wide range of ambient pressures from subatmospheric to superatmospheric pressure. In embodiments comprising a volatile graft monomer, superatmospheric pressure is preferably employed. In any event, the graft reaction is preferably carried out in the absence of oxygen or other reactive gas unless, of course, the gas is a desired graft monomer.

In the practice of some embodiments of the process of this invention it is possible for graft monomer material to cross-link the polyether polymer material and result in a polymer product of undesired hardness, toughness and resistance to solvents. In such instances, the graft reaction mixture also comprises retarder material. This is material composed of one or more compounds which minimize cross-linking. In general, the efficacy of such compounds depends to a large extent upon the composition of the graft monomer material. In this regard, a retarder for vinyl acetate does not necessarily work for methyl methacrylate. However, examples of compounds which minimize cross-linking of polyether polymer material by one or more graft monomers include aliphatic and aromatic nitro compounds such as, for example, nitrobenzene and the like, quinones, hydroquinones, phenols, olefins, terpenes, aldehydes, aromatic hydrocarbons, aliphatic and aromatic amines, allyl compounds, sulfur compounds such as mercaptans, sulphides, disulphides and the like, organic halides and the like.

Concentration of retarder material, when such is employed, likewise is in a broad range. Generally, it is in a range from about 0.001% by weight to about 5 times the weight of the graft monomer material and preferably in a range of from about 0.01 to about 100% by weight of the graft monomer material. However, higher and lower operable concentrations are within the broader concepts of this invention.

The best mode now contemplated of carrying out this invention is illustrated by the following examples of specific embodiments of this invention. This invention is not limited to these specific embodiments.

In the examples all parts and percentages are by weight unless otherwise indicated.

Also, in the examples typical RSV values are reported. RSV is an abbreviation of Reduced Specific Viscosity—($\eta_{sp}$/c.). RSV value is determined with the aid of a conventional Ubbelohde viscometer on a 0.1% by weight solution of the polymer in a solvent at a specific temperature. The RSV value of a polymer is of interest because usually it is a function of the molecular weight of the polymer. In this specification the report of each RSV value is accompanied by the temperature at which the viscosity measurement was made, and by an abbreviation of the name of the solvent (DMF=dimethylformamide, CH=cyclohexanone, CN=α-chloronaphthalene with 3% by weight acetylacetone, and B=benzene).

In addition in a number of examples typical stress-strain data (Tensile Strength, Elongation and Tensile Modulus) are reported for about 5 mil thick films compression molded from samples of the graft polymer products involved. These data are based on ASTM method D882–56T.

EXAMPLES 1–8

These examples illustrate specific embodiments of a graft polymer of this invention made from graft monomer material consisting essentially of styrene and acrylonitrile, and polyether polymer material consisting essentially of a copolymer of epichlorohydrin and ethylene oxide, and of a process for the synthesis of this graft polymer.

In each of these examples the procedure for making the graft polymer is as follows. A clean polymerization reactor is charged with liquid reaction medium and polyether polymer material. Air in the reactor is then replaced with nitrogen at 15 pounds per square inch gauge pressure. The reactor contents are agitated at 65° C. for about 12 hours to dissolve the polyether polymer material in the liquid reaction medium. If a solid graft monomer is involved, the reactor is opened, all solid monomer material is added, and the reactor is closed, evacuated and then pressurized with nitrogen to about 15 pounds per square inch gauge pressure. If any liquid or gaseous graft monomer is involved, it is then injected into the reactor. The free radical material, preferably in solution in liquid reaction medium, is injected into the reactor. While the reactor contents are agitated, they are established and maintained for a designated period of time at a designated temperature. A solution (0.3 part per part of starting polyether polymer material) of 2,5-di-t-amyl-hydroquinone (1%) and water (1%) in anhydrous ethanol is added to the reaction mixture to stop further reaction.

In each of these examples a graft polymer product is separated from the reaction mixture as follows. A 0.5% solution of 1,1,3-tri-(2-methyl-4-hydroxy-5-t-butylphenyl)butane, hereinafter referred to as TCA, in benzene is admixed with the reaction mixture in quantity sufficient to give a TCA concentration of about 0.5% of the isolated polymer product. Heptane (100–200 parts) containing TCA at 0.03% concentration is admixed with the reaction mixture to precipitate a graft polymer product. The precipitate is removed from the mixture by filtration, the filter cake is washed twice with heptane containing TCA at 0.03% concentration, and then placed in a vacuum for 16 hours at 80° C. to give a heptane-free graft polymer product.

In each of these examples the polyether polymer material consists essentially of a copolymer of epichlorohydrin and ethylene oxide, free of any phenolic antioxidant and having an epichlorohydrin content of about 68%, an ethylene oxide content of about 32%, an ash content of about 0.4% and an RSV (CN, 100° C.) of 4.3.

The quantity of polyether polymer material in each example charged to the reactor is 3 parts.

The graft monomer material in these examples consists essentially of sytrene and acrylonitrile. The total quantity of graft monomer material charged to the reactor in Examples 1–6 and 8 is 20 parts and in Example 7 is 10 parts. The relative weight ratio of styrene and acrylonitrile in the monomer material charged to the reactor is given in the following Table I.

The free radical material in each example consists essentially of benzoyl peroxide and the quantity of free radical material charged to the reactor is 0.1 part. It is introduced into the reactor dissolved at a 5% concentration in benzene.

In each one of these examples the liquid reaction medium is reagent grade benzene. The quantity used, including the quantity added with the free radical material, is 87 parts.

In each example the reaction temperature is 65° C. The reaction period is indicated in Table I.

Typical RSV values and analytical data of the graft polymer products of these examples are summarized in Table I.

TABLE I

| Ex. No. | Weight ratio of styrene to acrylonitrile | Reaction time, hours | Graft polymer product | | |
|---|---|---|---|---|---|
| | | | RSV (DMF, 25° C.) | Percent polyether in product | Percent acrylonitrile |
| 1 | 1:4 | 8 | 4.2 | 12.3 | 60.3 |
| 2 | 2:3 | 16 | 0.87 | | 29.2 |
| 3 | 2:3 | 23 | 2.5 | 18.9 | 38.6 |
| 4 | 2:3 | 32 | 2.4 | 31.9 | 26.5 |
| 5 | 1:1 | 23 | 1.8 | 24.2 | 27.3 |
| 6 | 3:2 | 23 | 1.9 | 25.4 | 23.9 |
| 7 | 7:3 | 23 | 1.6 | 26.9 | 19.3 |
| 8 | 7:3 | 36 | 2.6 | 31.6 | 17.4 |

A sample of the graft polymer product of Example 2, when compression molded for 5 minutes at 200° C. into a film, has these typical physical properties: Tensile Strength (p.s.i.)=10,700, Elongation (%)=4.9, and Tensile Modulus (p.s.i.)=377,000.

A sample of the graft polymer product of Example 7, when compression molded for 5 minutes at 200° C. into a film, has these typical physical properties: Tensile Strength (p.s.i.)=5900, Elongation (%)=9.5, and Tensile Modulus (p.s.i.)=220,000.

Each one of the graft polymers of these examples is useful as a material of construction for shaped molded articles.

EXAMPLES 9–11

These examples illustrate specific embodiments of a graft polymer of this invention made from acrylonitrile and a copolymer of epichlorohydrin and ethylene oxide, and of a process for making these graft polymer embodiments.

The graft reaction procedure followed in each of these Examples is described in Examples 1–8.

Graft polymer products are separated from the graft reaction mixture in Example 9 as follows. The graft reaction mixture is centrifuged to remove the benzene insoluble portion thereof. The solid material is washed three times with toluene and once with toluene containing 4,4′-thiobis(6-t-butyl-m-cresol) at 0.05% concentration, and is then placed in an 80° C. oven under vacuum for 16 hours, whereby a toluene-insoluble graft polymer product is obtained. This product is identified as the A product in the following Table II. The toluene wash liquids from the washings are combined, the combination is concentrated and admixed with toluene (3 parts) containing (TCA) at 1% concentration, and then the graft polymer separation procedure of Examples 1–8, using heptane as the precipitant, is followed to obtain a toluene-soluble graft polymer product. This product is identified as the B product in Table II.

Graft polymer products are separated from the graft reaction mixture in Examples 10 and 11 by the separation procedure of Examples 1–8.

The acrylonitrile is reagent grade acrylonitrile. The quantity added to the reactor in each example is indicated in Table II.

The free radical material consists essentially of benzoyl peroxide. The quantity of free radical material charged in benzene to the reactor in each example is given in Table III.

The liquid reaction medium employed in each of these examples is benzene. The quantity of benzene including that accompanying the free radical material, is given for each example in Table III.

The reaction temperature is 65° C. in each example, and the reaction time for each example is set forth in the table.

Typical RSV values and other typical data for the graft polymer products of these examples are given in Table III.

TABLE III

| Ex. No. | Polyether copolymer (parts) | Styrene (parts) | Liquid reaction medium (parts) | Free radical material | Reaction time (hours) | RSV (B, 25° C.) | Percent polyether in product | Appearances |
| --- | --- | --- | --- | --- | --- | --- | --- | --- |
| 12 | 3.0 | 20 | 26.4 | 0.1 | 24 | 1.4 | 33.5 | Soft foam. |
| 13 | 6.0 | 19.4 | 100 | 0.1 | 64 | 3.7 | 68.5 | Very tough rubber. |
| 14 | 12.0 | 2.5 | 100 | 0.15 | 40 | 2.3 | 97.0 | Tough rubber. |

The copolymer of epichlorohydrin and ethylene oxide is the same as in Example 1–8. The quantity used in each example is set forth in Table II.

The free radical material consists essentially of benzoyl peroxide. The quantity of free radical material charged to the reactor dissolved in benzene is set forth in Table II.

The liquid reaction medium employed in these examples is benzene, and the quantity present in each example, including that accompanying the free radical material, is 87 parts.

The graft reaction in each example is carried out at 65° C. for the period of time set forth in Table II.

Typical RSV values and other data for the isolated polymer products of these examples are reported in Table II.

TABLE II

| Ex. No. | Polyether copolymer (parts) | Acrylonitrile (parts) | Free radical material (parts) | Reaction time (hours) | RSV (DMF, 25° C.) | Percent polyether in product | Percent acrylonitrile |
| --- | --- | --- | --- | --- | --- | --- | --- |
| 9 | 3.0 | 20 | 0.1 | 15½ | A=5.2 | 15.8 | 72.0 |
|   |     |    |     |     | B=1.6 | 63.1 | 13.6 |
| 10 | 6.0 | 1.2 | 0.03 | 40 | 3.2 |  | 4.2 |
| 11 | 6.0 | 2.4 | 0.06 | 20 | 4.7 |  | 8.7 |

In Example 9 the X-ray pattern of the A product typically is that of polyacrylonitrile of high crystallinity, while the X-ray pattern of the B product is that of polyacrylonitrile of low crcystallinity. The A and B products are graft polymers, however, because the polyether polymer is normally soluble in toluene (the A product typically is not soluble in toluene), and polyacrylonitrile is normally insoluble in toluene (the B product typically is soluble in toluene).

The graft polymer A product of Example 9 is useful as a material of construction for molded articles where a tough plastic is desired, while the B product of Example 9 and the graft polymer products of Examples 10 and 11 are useful in articles where a tough rubbery material is wanted.

EXAMPLES 12–14

These examples illustrate specific embodiments of a graft polymer of styrene and a copolymer of epichlorohydrin and ethylene oxide.

The graft polymer product is made and isolated by the procedures described in Examples 1–8.

The styrene monomer is inhibitor-free commercial grade material. The quantity of it charged to the reactor in each example is set forth in the following Table III.

The copolymer of epichlorohydrin and ethylene oxide is described in Examples 1–8. The quantity of the copolymer in each example is given in Table III.

Typical physical property data of a compression molded (5 minutes at 200° C.) sample of the graft polymer product of Example 12 include: Tensile Strength (p.s.i.)=900, Elongation (%)=1, and Tensile Modulus (p.s.i.)=12,700

Typical physical property data of a compression molded (5 minutes at 200° C.) sample of the graft polymer product of Example 13 include: Tensile Strength (p.s.i.)=290. Elongation (%)=31, and Tensile Modulus (p.s.i.)=9800.

The graft polymer products of Examples 12 and 13 are useful as materials of construction for molded articles, while the graft polymer products of Example 14 are useful, when cross-linked, as materials of construction for articles and coatings where cross-linked rubbers are desired.

EXAMPLE 15

This example illustrates specific embodiments of a graft polymer of vinyl chloride and a copolymer of epichlorohydrin and ethylene oxide, and a process for making them.

The graft reaction procedure is described in Examples 1–8.

The vinyl chloride is reagent grade and the quantity used is 18 parts.

The copolymer of epichlorohydrin and ethylene oxide is the same as in Examples 1–8. The quantity of the copolymer charged to the reactor in this example is 3.0 parts.

The free radical material consists essentially of benzoyl peroxide. The quantity of free radical material dissolved in benzene and charged to the reactor is 0.1 part.

The reaction liquid medium is benzene. The quantity of reaction liquid medium, including that in which the free radical material is dissolved, is 87 parts.

The reaction temperature is 65° C. and the reaction time is 73 hours.

The graft reaction mixture thus obtained is divided into two portions with one portion being treated according to the graft polymer isolation procedure of Examples 1–8 to obtain unfractionated graft polymer product. This product typically is a tough solid having a low degree of crystallinity as determined by X-ray analysis. The RSV (DMF, 25° C.) is 2.7. Typical physical properties of a compression molded sample of this product comprises: Tensile (p.s.i.)=1400, Elongation (%)=8 and Tensile Modulus (p.s.i.)=105,000. This product is useful as a molding plastic for the manufacture of articles.

The other portion (20 parts) of the graft reaction mixture which typically gels on standing at 20–25° C., is treated as follows. Benzene (70 parts) is added and the mixture heated for 2–3 hours in a 65° C. bath to dissolve the gel. The hot benzene insoluble portion is centrifuged from the hot benzene solution and admixed with fresh benzene (70 parts). This mixture is heated 2–3 hours in a 65° C. bath. The remaining hot benzene insoluble material is centrifuged from the hot benzene, washed once at 20–25° C. with benzene containing TCA at 0.05% concentration, and then placed for 16 hours in an 80° C. vacuum oven.

The hot benzene insoluble graft polymer product thus obtained is typically a white matted powdery solid having a low degree of X-ray crystallinity. The RSV (DMF, 25° C.) typically is 2.7. The product has typically a 31% polyether content and a 69% polyvinyl chloride content. This product has utility as a molding plastic for tough plastic articles.

The benzene solutions or supernatants are combined, a methanol solution (0.4 part) of TCA at 1% concentration is admixed, and the mixture is concentrated under vacuum until viscous. Heptane containing TCA at 0.03% concentration is then admixed with the viscous solution, whereupon precipitation of a solid occurs. This solid is washed twice with heptane containing TCA at 0.03% concentration, and then the solid is placed for 16 hours at 80° C. in a vacuum oven to remove residual heptane.

The benzene-soluble graft polymer product thus obtained is typically a somewhat hard solid in the nature of a partly fused powder. It has a low order of X-ray crystallinity and a typical RSV (DMF, 25° C.) of 2.4. The percentage of polyether polymer present in the graft polymer, as determined by chlorine analysis, typically is 35%, and the percentage of polyvinyl chloride polymer present typically is 65%.

This product has utility as a molding plastic.

EXAMPLE 16

This example illustrates a specific embodiment of a graft polymer of vinyl chloride and poly(2-chloroethyl glycidyl ether), and a process for making them.

The graft reaction procedure is described in Examples 1–8.

The vinyl chloride is reagent grade and the quantity used is 18 parts.

The poly(2-chloroethyl glycidyl ether) is a diethyl ether insoluble polymer made as described in Example 5 of U.S. Patent 3,214,390, but without any antioxidant. A typical RSV (CH, 50° C.)=0.52.

The free radical material consists essentially of benzoyl peroxide. The quantity of free radical material dissolved in benzene and charged to the reactor is 0.1 part.

The reaction liquid medium is benzene. The quantity of reaction liquid medium, including that in which the free radical material is dissolved, is 87 parts.

The reaction temperature is 65° C. and the reaction time is 73 hours.

The graft reaction mixture thus obtained is treated according to the graft polymer isolation procedure of Examples 1–8 to obtain an unfractionated graft polymer product. This product typically is a tough solid, RSV (DMF, 25° C.)=2.0, having low X-ray crystallinity and a polyether content of 28%.

This product is useful as a material of construction for films.

EXAMPLES 17–19

These examples illustrate specific embodiments of a graft polymer of maleic anhydride and a copolymer of epichlorohydrin and ethylene oxide.

The graft reaction procedure and graft polymer product isolation procedure followed in each of these examples are the same as in Examples 1–8.

The maleic anhydride is reagent grade. The quantity employed in each of these examples is about 11.9 parts.

The polyether polymer is the same as that in Examples 1–8. The quantity charged to the reactor in each example is 54.0 parts.

The free radical material consists essentially of benzoyl peroxide. The quantity of free radical material dissolved in benzene and charged to the reactor in each of the examples is set forth in Table IV.

The liquid reaction medium used in these examples is benzene. The quantity employed in each example, including that with the free radical material, is given in Table IV.

In each example the reaction temperature is 80° C. and the reaction time is 18 hours.

Typical RSV values and other properties of the graft polymers of these examples are reported in Table IV.

TABLE IV

| Ex. No. | Liquid reaction medium (parts) | Free radical material (parts) | RSV (CN, 100° C.) | Percent polyether in polymer (based on Cl analysis) | Appearance |
|---|---|---|---|---|---|
| 17 | 430 | 1.78 | 0.23 | 88 | Tacky rubber. |
| 18 | 526 | 0.35 | 0.65 | 95 | Rubber. |
| 19 | 526 | 0.09 | 1.6 | 93 | Do. |

The specific graft polymers of these examples have utility as adhesives for bonding epichlorohydrin and poly(vinyl chloride) to metals and other substrates.

EXAMPLE 20

This example illustrates a specific embodiment of a graft polymer of maleic anhydride and polyepichlorohydrin, according to this invention.

The graft reaction procedure and graft polymer product isolation procedure employed in this example are the same as described for Examples 1–8.

The maleic anhydride is reagent grade and the quantity used is 11.9 parts.

The starting polyether polymer material is the acetone insoluble fraction of the ether insoluble polymer product made according to Example 8 of the U.S. Pat. 3,135,705, but without the Santonox antioxidant. It consists essentially of crystalline isotactic polyepichlorohydrin. A typical RSV (CN, 100° C.) for this product is 5 and it has high X-ray crystallinity.

The graft polymer product obtained according to this example is typically a tough hard solid with a maleic anhydride content of about 2%, an RSV (SN, 100° C.) of 1.8, and highly crystalline by X-ray.

It can be compression molded at 150° C. to give a tough film which has improved adhesion to metals.

By milling it with a stoichiometric quantity of sodium methoxide and then compression molding at 150° C., a clearer, tougher film can be obtained.

EXAMPLES 21 AND 22

These examples illustrate specific embodiments of a graft polymer of vinyl acetate and a copolymer of epichlorohydrin and ethylene oxide.

The graft reaction procedure and the graft polymer product isolation procedure are the same as in Examples 1–8.

The vinyl acetate employed in these examples is a distilled vinyl acetate with the quantity in each case being 20 parts.

The polyether polymer is the same as in Examples 1–8. In each case, the quantity is 3.0 parts.

The free radical material consists essentially of benzoyl peroxide. The quantity charged to the reactor, dissolved in benzene, is 0.1 part in each example.

The reaction liquid medium is benzene. The quantity used in each example, including that introduced with the free radical material, is 87 parts.

The reaction temperature in each example is 65° C. The reaction time is given for each example in the following Table V.

Data on the isolated graft polymer products are summarized in Table V.

TABLE V

| Ex. No. | Reaction time (hours) | Graft polymer product | | |
| --- | --- | --- | --- | --- |
| | | RSV (DMF, 25° C.) | Percent polyether polymer | Appearance |
| 21 | 16 | 0.69 | 18.8 | Hard, tough solid. |
| 22 | 70 | 1.1 | 22.7 | Do. |

Typical physical properties of a compression molded (5 minutes at 200° C.) sample of the graft polymer product of Example 22 are: Tensile Strength (p.s.i.)=1200, Elongation (%)=550, Tensile Modulus (p.s.i.)=13,000.

The graft polymer products of these examples are useful as adhesives.

Moreover, the graft polymer product of Example 22 is useful in safety glass. The polymer product can be compression molded at 180° C. to give a very clear flexible film 10 mils thick. When such a film is placed between two panels of glass, heated under pressure for 3 minutes at 180° C., and then cooled, the result typically is an excellent safety glass which on breaking with a hammer retains the small glass particles.

EXAMPLES 23–26

These examples illustrate specific embodiments of a graft polymer of methyl methacrylate and a copolymer of epichlorohydrin and ethylene oxide.

The graft reaction procedure and graft polymer product separation procedure employed in each example are the procedures of Examples 1–8.

The methyl methacrylate used in each of these examples is distilled material with the quantity charged to the reactor being given in Table VI.

The polyether polymer is the same as in Examples 1–8. The quantity introduced into the reactor in each example is set forth in Table VI.

The free radical material consists essentially of benzoyl peroxide, and the quantity dissolved in benzene and charged to the reactor in each example is 0.1 part.

Benzene is the liquid reaction medium in each example, and the quantity involved in each instance, including that with the free radical material, is 87 parts.

The reaction temperature is 65° C. and the reaction time is reported for each example in Table VI.

Typical data obtained on the isolated graft polymer products of these examples are presented in Table VI.

The graft polymer products of Examples 23–25 are useful as clear, impact resistant plastics, while the graft polymer product of Example 26 is useful as a rubber having strength without vulcanization.

EXAMPLE 27

This example illustrates specific embodiments of a graft polymer of vinylidene chloride and a copolymer of epichlorohydrin and ethylene oxide.

The graft reaction procedure is the same as in Examples 1–8.

The vinylidene chloride is commercially available vinylidene chloride washed two times with a 10% aqueous solution of sodium hydroxide and then washed to neutrality with water. The quantity of vinylidene chloride charged to the reactor is 52 parts.

The polyether polymer is the same as in Examples 1–8. The quantity introduced into the reactor is 30 parts.

The free radical material consists essentially of benzoyl peroxide. The quantity of this material introduced in benzene into the reactor is 0.25 part.

The liquid reaction medium is benzene. The quantity involved, including that injected with the free radical material, is 220 parts.

The reaction temperature is 65° C. and the reaction time is 27 hours.

The graft reaction mixture is divided into two portions.

One portion is treated according to the graft product separation procedure of Examples 1–8 to obtain an unfractionated graft polymer product. This product is typically a soft white powder with an RSV (DMF, 135° C.)= 0.31, and a chlorine content of 60%, indicating a polyether content of 27%. This product is useful as a material of construction for molded plastic articles.

The other portion (20 parts) of the graft reaction mixture is admixed with benzene (70 parts). The result is a mixture of benzene solution and insoluble material. The insoluble material is centrifuged from the benzene solution and admixed with more benzene (70 parts). The remaining insoluble material is centrifuged from the resulting benzene solution, washed with benzene containing TCA at 0.05% concentration, and then placed in an 80° C. vacuum oven for 16 hours. The product thus obtained is a benzene insoluble fraction of the main graft polymer product, and in itself is a graft polymer product.

This benzene insoluble fraction or graft polymer product typically is a white powder, has an RSV (DMF, 135° C.)=0.37, and has a chlorine content of 60.6%, which indicates a polyether content of 26%. It is useful as a molding plastic.

The benzene solutions from the centrifuging steps are combined, admixed with a methanol solution (0.4 part) containing TCA at 1% concentration, concentrated under vacuum until viscous, and then subjected to the graft polymer product isolation procedure of Examples 1–8 to provide a benzene-soluble fraction of the main graft

TABLE VI

| Ex. No. | Polyether copolymer (parts) | Methyl methacrylate (parts) | Reaction time (hours) | Graft polymer product | | |
| --- | --- | --- | --- | --- | --- | --- |
| | | | | RSV (DMF, 25° C.) | Percent polyether in polymer | Appearance |
| 23 | 6.0 | 20 | 16 | 1.9 | 31.2 | Tough solid. |
| 24 | 6.0 | 20 | 40 | 1.4 | 26.2 | Do. |
| 25 | 3.0 | 20 | 16 | 0.92 | 17.3 | Do. |
| 26 | 12.0 | 2.5 | 40 | 2.4 | 85.5 | Tough rubber. |

Typical physical properties of a compression molded (5 minutes at 200° C.) sample of the graft polymer product of Example 24, which compression molded sample is typically a clear film, are: Tensile Strength (p.s.i.)=5700, Elongation (%)=5.3, and Tensile Modulus (p.s.i.)=166,000.

polymer product, which fraction is a graft polymer product of this invention.

The benzene soluble fraction, another graft polymer product, typically is rubbery, has an RSV (DMF, 135° C.) of 1.3 and a chlorine content of 26.4% which indicates a polyether content of 95%. This product has utility as a vulcanized elastomer.

Thus, this invention provides a new and useful graft polymer with many embodiments.

Other features, advantages, and specific embodiments of this invention will be readily apparent to those exercising ordinary skill in the art after reading the foregoing disclosures. These specific embodiments are within the scope of the claimed subject matter unless expressly excluded by claim language. In this connection, while specific embodiments of this invention have been described in considerable detail, variations and modifications of these embodiments can be effected without departing from the spirit and scope of the invention as disclosed and claimed.

What I claim and desire to protect by Letters Patent is:

1. A normally solid polyether polymer having (a) at least one halo-substituted radical bonded to a chain carbon and selected from the group consisting of halo-substituted hydrocarbon, halo-substituted hydrocarbon-oxy and halo-substituted hydrocarbon-oxy-hydrocarbon radicals, and (b) a graft bonded directly to at least one chain carbon and comprising at least one free radically polymerizable ethylenically unsaturated monomer unit.

2. A polymer according to claim 1, wherein said graft comprises a polymer of free radically polymerizable ethylenically unsaturated monomer material.

3. A polymer according to claim 2, wherein said polyether polymer comprises a recurring monomer unit corresponding to epichlorohydrin.

4. A polymer according to claim 3, wherein said polyether polymer comprises another recurring monomer unit corresponding to ethylene oxide.

5. A polymer according to claim 4, wherein said graft comprises monomer units selected from the group consisting of styrene, vinyl chloride, vinyl acetate, methyl methacrylate, and vinylidene chloride monomer units.

6. A polymer according to claim 2, wherein said polyether polymer comprises a recurring monomer unit corresponding to 2-chloroethyl glycidyl ether.

7. A polymer according to claim 6, wherein said graft comprises vinyl chloride monomer units.

8. A process for making a normally solid graft polymer product comprising a normally solid polyether polymer having (a) at least one halo-substituted radical bonded to a chain carbon and selected from the group consisting of halo-substituted hydrocarbon, halo-substituted hydrocarbon-oxy and halo-substituted hydrocarbon-oxy-hydrocarbon radicals, and (b) a graft bonded directly to at least one chain carbon, which graft comprises at least one free radically polymerizable ethylenically unsaturated monomer unit, which comprises: effecting reaction of (1) polyether polymer material comprising a normally solid starting polyether polymer having (a) at least one halo-substituted radical bonded to a chain carbon and selected from the group consisting of halo-substituted hydrocarbon, halo-substituted hydrocarbon-oxy and halo-substituted hydrocarbon-oxy-hydrocarbon radicals, and (b) at least one hydrogen bonded to a chain carbon, and (2) free radically polymerizable ethylenically unsaturated monomer material said reaction being carried out in the presence of a free radical catalyst.

9. A process according to claim 8, wherein said starting polyether polymer has a recurring monomer unit having (a) at least one halo-substituted radical bonded to a chain carbon and selected from the group consisting of halo-substituted hydrocarbon, halo-substituted hydrocarbon-oxy and halo-substituted hydrocarbon-oxy-hydrocarbon radicals, and (b) at least one hydrogen bonded to a chain carbon.

10. A process according to claim 9, wherein said feed polyether polymer is a copolymer of epichlorohydrin and ethylene oxide.

11. A process according to claim 10, wherein said free radical material comprises benzoyl peroxide.

12. A process according to claim 11, wherein said monomer material is selected from the group consisting of styrene, acrylonitrile, vinyl chloride, maleic anhydride, vinyl acetate, methyl methacrylate, and vinylidene chloride.

13. A shaped article composed of a polymer according to claim 1.

References Cited

UNITED STATES PATENTS

| | | | |
|---|---|---|---|
| 2,871,219 | 1/1959 | Baggett et al. | 260—45.95 |
| 3,247,291 | 4/1966 | Kahrs et al. | 260—899 |
| 3,522,326 | 7/1970 | Bostick et al. | 260—823 |
| 3,546,321 | 12/1970 | Jabloner et al. | 260—874 |

MURRAY TILLMAN, Primary Examiner

J. SEIBERT, Assistant Examiner

U.S. Cl. X.R.

117—161 UZ, 161 UT, 161 UD, 161 UN, 161 UC, 161 ZB, 203; 260—33.6 EP, 33.6 F, 33.6 PQ, 33.6 UA, 879, 881, 884, 895, 897 C, 898, 900